(12) United States Patent　　　　(10) Patent No.: US 12,695,839 B2

Kohama　　　　(45) Date of Patent: Jul. 28, 2026

(54) IMAGE READING SYSTEM, IMAGE READING DEVICE, AND IMAGE READING METHOD

(71) Applicant: SEIKO EPSON CORPORATION, Tokyo (JP)

(72) Inventor: Yuji Kohama, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 282 days.

(21) Appl. No.: 18/661,839

(22) Filed: May 13, 2024

(65) Prior Publication Data

US 2024/0388668 A1　　Nov. 21, 2024

(30) Foreign Application Priority Data

May 15, 2023　(JP) ................................. 2023-079789

(51) Int. Cl.
| | |
|---|---|
| *H04N 1/00* | (2006.01) |
| *H04N 1/203* | (2006.01) |
| *H04N 1/387* | (2006.01) |
| *H04N 1/32* | (2006.01) |

(52) U.S. Cl.
CPC ..... *H04N 1/00803* (2013.01); *H04N 1/00705* (2013.01); *H04N 1/00758* (2013.01); *H04N 1/00779* (2013.01); *H04N 1/203* (2013.01); *H04N 1/2038* (2013.01); *H04N 1/3873* (2013.01); *H04N 1/32267* (2013.01); *H04N 2201/3288* (2013.01)

(58) Field of Classification Search
None
See application file for complete search history.

(56) References Cited

U.S. PATENT DOCUMENTS

| | | | | |
|---|---|---|---|---|
| 6,678,071 B1* | 1/2004 | Saito | .................. | H04N 1/00737 |
| | | | | 358/488 |
| 2005/0128539 A1* | 6/2005 | Takano | ................ | H04N 1/6027 |
| | | | | 358/521 |
| 2006/0158691 A1* | 7/2006 | Kakutani | ........... | H04N 1/40087 |
| | | | | 358/3.01 |
| 2007/0081212 A1* | 4/2007 | Tonami | .............. | H04N 1/00724 |
| | | | | 271/3.14 |
| 2009/0279108 A1* | 11/2009 | Hoshi | ................ | G06K 15/1889 |
| | | | | 358/1.9 |
| 2012/0026543 A1* | 2/2012 | Nakao | ................ | H04N 1/00968 |
| | | | | 358/1.15 |
| 2017/0126911 A1* | 5/2017 | Kogi | .................... | H04N 1/0035 |
| 2019/0354320 A1* | 11/2019 | Ito | ........................ | H04N 1/3873 |
| 2020/0195800 A1* | 6/2020 | Takase | ............... | H04N 1/00761 |
| 2022/0360680 A1* | 11/2022 | Ueda | ................... | H04N 1/2369 |

FOREIGN PATENT DOCUMENTS

JP　　　　2008-092451 A　　4/2008

* cited by examiner

*Primary Examiner* — Abderrahim Merouan
*Assistant Examiner* — Pawan Dhingra
(74) *Attorney, Agent, or Firm* — WORKMAN NYDEGGER

(57) ABSTRACT

An image reading system includes a control section, wherein when a document region among the image data is included in the first region, a control section applies a first output setting associated with the first region to the document region and executes output for the document region, and when a document region is included in the second region, the control section applies a second output setting associated with the second region to the document region and executes output for the document region.

11 Claims, 9 Drawing Sheets

IMAGE READING SYSTEM, IMAGE READING DEVICE, AND IMAGE READING METHOD

The present application is based on, and claims priority from JP Application Serial Number 2023-079789, filed May 15, 2023, the disclosure of which is hereby incorporated by reference herein in its entirety.

BACKGROUND

1. Technical Field

The present disclosure relates to an image reading system, an image reading device, and an image reading method.

2. Related Art

A scanner can generate image data by reading a document desired by a user, and output and save the image data as a file in an output destination. A user can manually and arbitrarily set various elements and items, such as image quality, file format, output destination, and file name, for processing of such image data every time scanning is performed.

As a technique for reducing time and effort of the user, there is disclosed a scanner system including an image reading unit for reading an image on a document placement section and a document position acquisition unit for acquiring a document position on the document placement section for each of one or more sheets of the document placed on the document placement section, and changing a processing operation after an image reading process, depending on a position at which the document is placed on the document placement section (refer to JP-A-2008-92451). According to JP-A-2008-92451, a destination to save scanned data is changed, or a setting of the scanning itself is changed, depending on a position where the document is placed.

Here, in a sheet feed type scanner which reads a document while transporting the document, an improvement is required for reducing time and effort of the user who attempts to switch settings related to processing after reading an image.

SUMMARY

An image reading system includes a transport section configured to transport a document in a predetermined transport direction; a reading section configured to read the document transported by the transport section; and a control section configured to output image data generated by reading by the reading section to a designated output destination, wherein the transport section includes a first transport section and a second transport section at different positions in an intersecting direction intersecting the transport direction, the image reading system includes a storage section configured to store a correspondence relationship between each of a plurality of divided regions, which are different regions of the image data and which include a first region corresponding to the first transport section side in the intersecting direction and a second region corresponding to the second transport section side in the intersecting direction, and output settings applied to the image data during a process for output, and the control section extracts a document region corresponding to the document from the image data, determines which of the divided regions includes the document region, when the control section determines that the document region is included in the first region, applies a first output setting associated with the first region among the output settings stored in the storage section to the document region to execute the output for the document region, and when the control section determines that the document region is included in the second region, applies a second output setting associated with the second region among the output settings stored in the storage section to the document region to execute the output for the document region.

An image reading device includes a transport section configured to transport a document in a predetermined transport direction; a reading section configured to read the document transported by the transport section; and a control section configured to output image data generated by reading by the reading section to a designated output destination, wherein the transport section includes a first transport section and a second transport section at different positions in an intersecting direction intersecting the transport direction, the image reading device includes a storage section configured to store a correspondence relationship between each of a plurality of divided regions, which are different regions of the image data and which include a first region corresponding to the first transport section side in the intersecting direction and a second region corresponding to the second transport section side in the intersecting direction, and output settings applied to the image data during a process for output, and the control section extracts a document region corresponding to the document from the image data, determines which of the divided regions includes the document region, when the control section determines that the document region is included in the first region, applies a first output setting associated with the first region among the output settings stored in the storage section to the document region to execute the output for the document region, and when the control section determines that the document region is included in the second region, applies a second output setting associated with the second region among the output settings stored in the storage section to the document region to execute the output for the document region.

An image reading method includes a transporting step of transporting a document in a predetermined transport direction by a transport section; a reading step of reading the document transported in the transporting step; and an outputting step of outputting image data generated in the reading step to a specified output destination, wherein the transport section includes a first transport section and a second transport section at different positions in an intersecting direction intersecting the transport direction and in the outputting step, extracting a document region corresponding to the document from the image data, determining in which of a plurality of divided regions the document region is included, the plurality of divided regions being different regions of the image data and including a first region corresponding to the first transport section side in the intersecting direction and a second region corresponding to the second transport section side in the intersecting direction, referring to a storage section that stores a correspondence relationship between each of the plurality of divided regions and an output setting to be applied to the image data during a process for the output when determining that the document region is included in the first region, applying a first output setting, which is among the output settings and is associated with the first region, to the document region to execute the output for the document region, and referring to the storage section when determining that the document region is included in the second region, applying a second output setting, which is among the output settings and is associated with the second region, to the document region to execute the output for the document region.

DESCRIPTION OF EMBODIMENTS

Hereinafter, embodiments of the present disclosure will be described with reference to the drawings. Each of the drawings is merely an example for explaining the present embodiment. Since each drawing is an example, the ratio, the shape, and the shading may not be accurate, may not match each other, or may be partially omitted.

1. Brief Description of System Configuration

Figure 1:
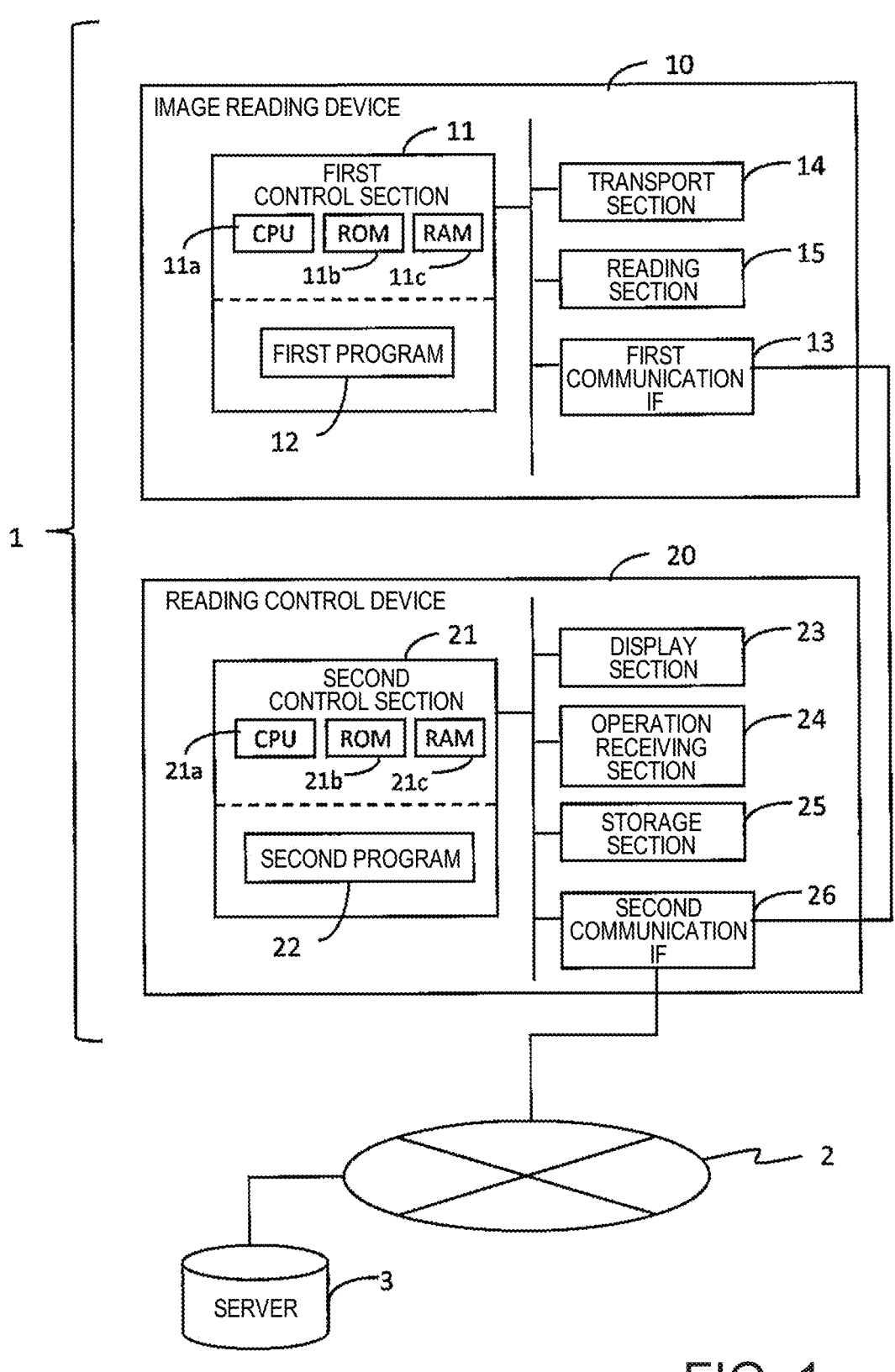
FIG. 1 is a diagram schematically showing a system configuration.

FIG. 1 schematically shows a configuration of an image reading system 1 according to the present embodiment. The image reading system 1 includes an image reading device 10 and a reading control device 20. An image reading method is executed by a configuration of at least a part of the image reading system 1.

The image reading device 10 is a sheet feed type scanner, and includes a first control section 11, a first communication IF 13, a transport section 14, a reading section 15, and the like. IF is an abbreviation for interface. The first control section 11 is configured to include one or a plurality of ICs including a CPU 11$a$, a ROM 11$b$, a RAM 11$c$, and the like as a processor, other nonvolatile memories, and the like.

In the first control section 11, a processor, that is, the CPU 11$a$, executes calculation processes according to a first program 12 saved in the ROM 11$b$, another memory, or the like by using the RAM 11$c$ or the like as a working area, and by this, controlling the transport section 14, the reading section 15, and the like. The first program 12 is also referred to as firmware. The processor is not limited to one CPU, and may be configured to perform processing by a plurality of CPUs or a hardware circuit such as an ASIC, or may be configured to perform processing by a CPU and a hardware circuit in cooperation with each other.

The first communication IF 13 is a generic name of one or a plurality of IFs for communicating with the outside in a wired or wireless manner in accordance with a predetermined communication protocol including a known communication standard.

The transport section 14 is a unit for transporting a document to be read in a predetermined transport direction. The transport section 14 includes a roller that rotates to transport a document, a motor as a power source for rotation, and the like. The transport section 14 may also have a function of a so-called auto document feeder (ADF) capable of sequentially transporting a plurality of sheets of the document placed on a document tray (not shown) one sheet at a time.

The reading section 15 is a unit for optically reading a document transported by the transport section 14. The reading section 15 includes a general configuration as a scanner, such as a light source that irradiates a document, an image sensor that receives reflected light or transmitted light from the document and generates and outputs an electric signal as a read result by photoelectric conversion, and an analog front end that converts an output from the image sensor into a digital signal to obtain image data. It may be understood that a part of the reading section 15 is performed by a circuit included in the first control section 11.

The reading control device 20 communicates with the image reading device 10. The reading control device 20 is, for example, various devices such as a personal computer, a server, a smartphone, and a tablet type device. The reading control device 20 includes a second control section 21, a display section 23, an operation receiving section 24, a storage section 25, a second communication IF 26, and the like. The second control section 21 is configured to include one or a plurality of ICs including a CPU 21$a$, a ROM 21$b$, a RAM 21$c$, and the like as a processor, other nonvolatile memories, and the like.

In the second control section 21, a processor, that is, the CPU 21$a$, executes arithmetic processing according to a second program 22 saved in the ROM 21$b$, another memory, or the like by using the RAM 21$c$ or the like as a working area, and by this, controlling the reading control device 20 and the image reading device 10. The second program 22 may be referred to as a driver or an application.

The second communication IF 26 is a general name of one or a plurality of IFs for communicating with the outside in a wired or wireless manner in accordance with a predetermined communication protocol including a known communication standard. In the example of FIG. 1, the image reading device 10 and the reading control device 20 are communicably connected via the first communication IF 13 and the second communication IF 26.

The display section 23 is a unit for displaying visual information, and includes, for example, a liquid crystal display, an organic electro-luminescence display, or the like. The display section 23 may be configured to include a display and a drive circuit for driving the display.

The operation receiving section 24 is a unit for receiving an operation or an input by a user, and is realized by, for example, a physical button, a touch screen, a mouse, a keyboard, or the like. The operation receiving section 24 as a touch screen is realized as one function of the display section 23.

Although not shown in the drawings, the image reading device 10 may include the display section 23 and the operation receiving section 24. That is, the display section 23 and the operation receiving section 24 may be in either the reading control device 20 and the image reading device 10, or may be in either. The image reading device 10 includes, as a type of operation receiving section 24, a button for receiving an instruction to start or stop scanning a document from a user.

The storage section 25 is, for example, a hard disk drive, a solid state drive, or other memory storage units. A part of a memory included in the second control section 21 may be regarded as the storage section 25. The storage section 25 may be regarded as a part of the second control section 21.

The reading control device 20 is connected to a network 2 via the second communication IF 26. The network 2 is a concept including a local area network and the Internet. The reading control device 20 can access an external device (not shown), an external server 3, and various cloud services via the network 2.

The image reading system 1 is configured to include a plurality of devices according to FIG. 1, but may be realized by one device. That is, an actual state of the image reading system 1 is a single image reading device 10, and the reading control device 20 may be understood to be a part of an internal configuration of such a single image reading device 10. The first control section 11 and the second control section 21 are collectively regarded as a "control section" of the present embodiment. Hereinafter, processing executed by each of the first control section 11 and the second control section 21 will be described in some cases, but it is not necessary to strictly understand functions and role sharing of each of the first control section 11 and the second control section 21 as described above. At least a part of the processing executed by the first control section 11 may be performed by the second control section 21, and conversely, at least a part of the processing executed by the second control section 21 may be performed by the first control section 11. As long as the image reading system 1 is actually one image reading device 10, the first control section 11 and the second control section 21 need not be distinguished from each other.

2. Description of Transport Section

Figure 2A:
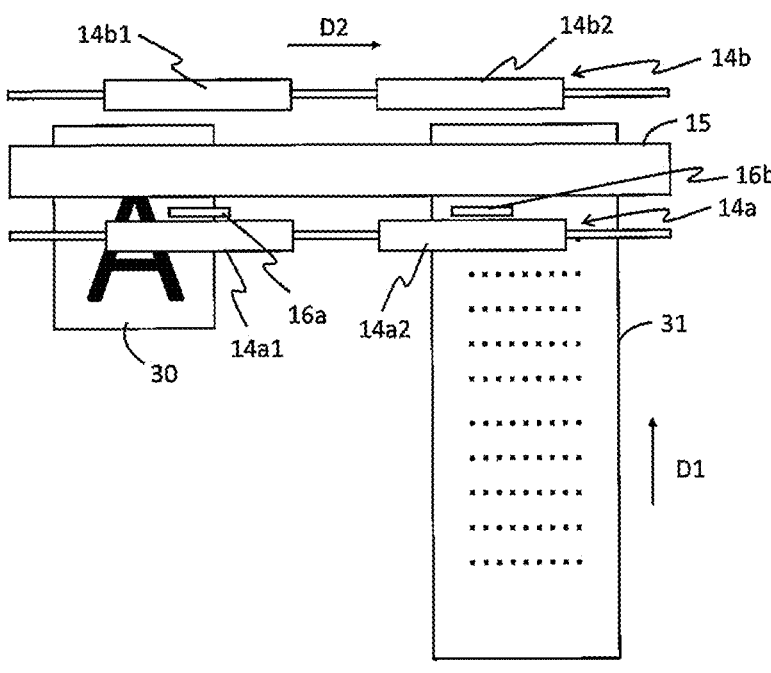
FIG. 2A is a diagram schematically showing a configuration example including a transport section and a reading section from a viewpoint from above.

FIG. 2A schematically shows a configuration including the transport section 14 and the reading section 15 from a viewpoint from above. A direction D1 indicates a "transport direction D1" by the transport section 14. Hereinafter, upstream and downstream in the transport direction D1 are simply referred to as upstream and downstream. The reading section 15 is elongated along an "intersecting direction D2" that intersects the transport direction D1. The intersecting direction D2 is also referred to as a "width direction D2". The term "intersection" here may be understood as orthogonal or nearly orthogonal. The length in the width direction D2 is referred to as width.

A transport roller 14a serving as the transport section 14 is arranged at a predetermined position upstream of the reading section 15. A transport roller 14b serving as the transport section 14 is arranged at a predetermined position downstream of the reading section 15. Although not shown in FIG. 2A, a roller is also arranged below each of the transport rollers 14a and 14b. That is, each of the transport rollers 14a and 14b is a part of a roller pair that rotates while nipping a document between a pair of upper and lower rollers. The transport roller 14a transports, for example, a document manually inserted by a user downstream and causes the document to pass through a position of the reading section 15. The document is read by the reading section 15 when it passes through the position of the reading section 15. The document that has passed through the position of the reading section 15 is further transported downstream by the transport roller 14b and discharged.

Although omitted in FIG. 2A, it goes without saying that a roller may be further arranged at a position upstream of the transport roller 14a. That is, a document placed on a document tray (not shown) may be transported downstream by a roller upstream of the transport roller 14a, and further transported downstream by the transport roller 14a.

The transport section 14 includes a "first transport section" and a "second transport section" at different positions in the width direction D2. In FIG. 2A, for example, a first roller 14a1 of the transport roller 14a is regarded as the first transport section, and a second roller 14a2 of the transport roller 14a is regarded as the second transport section. The correspondence relationship between the first roller 14a1 and the second roller 14a2, and the first transport section and the second transport section may be reversed. Hereinafter, for convenience of description, left and right based on the viewpoint of FIG. 2A are treated as left and right. Of course, left and right may be referred to as one side, the other side, and the like in the width direction D2.

For example, when a user scans a card such as a business card or an identification card, a receipt, a postcard, or another relatively small document, the user can set the document at various positions in the width direction D2 and scan the document. Here, a small document is assumed to mainly be a document whose width is approximately half the width of the reading section 15 or smaller than half the width of the reading section 15. Documents 30 and 31 shown in FIG. 2A are examples of such small documents. According to FIG. 2A, the document 30 is transported by the first transport section, that is, the first roller 14a1, at a position close to a left end of the reading section 15, and is read by the reading section 15. The position of the left roller 14b1 of the transport roller 14b in the width direction D2 corresponds to the position of the first roller 14a1.

Similarly, according to FIG. 2A, the document 31 is transported by the second transport section, that is, the second roller 14a2, at a position close to a right end of the reading section 15, and is read by the reading section 15. The position of the right roller 14b2 of the transport roller 14b in the width direction D2 corresponds to the position of the second roller 14a2. A user can cause the transport section 14 to transport the documents 30 and 31 at the same time or substantially the same time and cause the reading section 15 to read the documents 30 and 31, or can cause the transport section 14 to transport the documents 30 and 31 at different timings and cause the reading section 15 to read the documents 30 and 31. According to FIG. 2A, the transport roller 14a and the transport roller 14b each include two right and left rollers, but naturally, the transport roller 14a and the transport roller 14b may include three or more rollers arranged along the width direction D2.

Figure 2B:
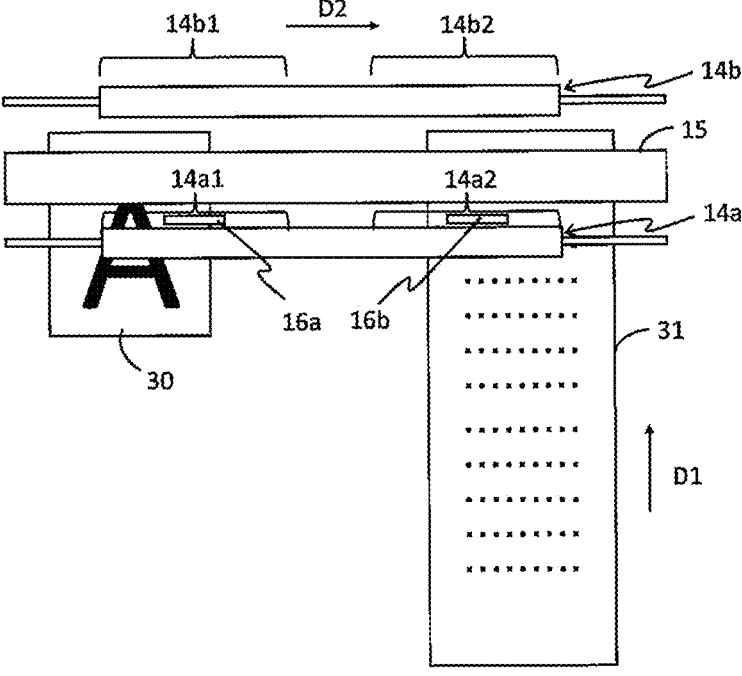
FIG. 2B is a diagram schematically showing a configuration example including a transport section and a reading section from a viewpoint from above.

FIG. 2B schematically shows a configuration including the transport section 14 and the reading section 15, which is different from FIG. 2A, from a viewpoint from above. Since the view of FIG. 2B is the same as that of FIG. 2A, only the points different from FIG. 2A will be described regarding FIG. 2B. The first transport section and the second transport section may be different portions of a common roller in the width direction D2. According to FIG. 2B, the transport roller 14a located upstream of the reading section 15 is a single roller that is not separated to left and right, unlike that of FIG. 2A. A portion including a left end of the transport roller 14a may be regarded as the first roller 14a1, and a portion including a right end of the transport roller 14*a* may be regarded as the second roller 14*a*2. Similarly, according to FIG. 2B, the transport roller 14*b* located downstream of the reading section 15 is also a single roller that is not separated to left and right, unlike FIG. 2A. A portion including a left end of the transport roller 14*b* is regarded as the roller 14*b*1, and a portion including a right end of the transport roller 14*b* is regarded as the roller 14*b*2.

The control section can output image data generated by the reading section 15 to a designated output destination. Such a process for output is simply referred to as an "output process". In the present embodiment, the control section can change a setting of the output process of image data according to a position of a document at the time of transport such as left and right described above. Needless to say, a user can also cause the image reading device 10 to read a large document having a width extending over most of the width of the reading section 15. However, such a large document is not suitable for clearly changing a position in the width direction D2. For this reason, a user can arbitrarily select a "first reading mode" in which a setting of an output process is changed according to a position of a document to be transported and a "second reading mode" in which a setting of an output process is not changed according to a position of a document to be transported by an operation. In the following description, it is assumed that the first reading mode is selected.

3. Switching Setting of Output Process According to Document Position

Figure 3:
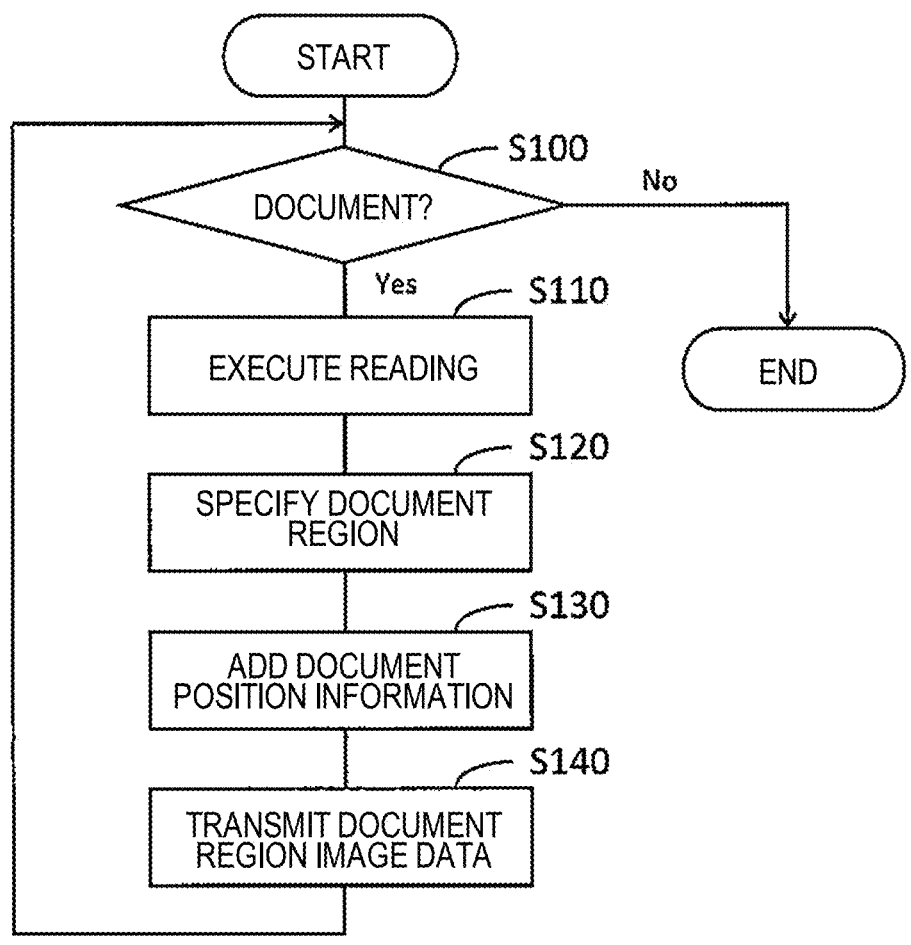
FIG. 3 is a flowchart showing a process executed by an image reading device.

FIG. 3 is a flowchart showing a process executed by the first control section 11 of the image reading device 10 in accordance with the first program 12. The description relating to FIG. 3 and FIG. 4 to be described later corresponds to the description of the image reading method.

A user operates the operation receiving section 24 to instruct the image reading device 10 to start scanning a document. The first control section 11 starts a flowchart in FIG. 3 upon receiving an instruction to start scanning.

In step S100, the first control section 11 determines presence or absence of a document. For example, the image reading device 10 includes a sensor that detects a document on a document tray (not shown). Accordingly, if a document is detected by the sensor, the first control section 11 determines that a document is present, that is, "Yes" in step S100, and proceeds to step S110. On the other hand, if a document is not currently detected by the sensor, the first control section 11 determines that there is no document, that is, "No" in step S100, and ends the flowchart of FIG. 3.

Alternatively, the image reading device 10 may detect a document at a position close to the transport roller 14*a* regardless of presence or absence of a document tray. According to FIGS. 2A and 2B, the image reading device 10 includes a plurality of sensors that are located upstream of the reading section 15 in the transport direction D1 and that can detect a document, specifically, a first sensor 16*a* located on a side of the first roller 14*a*1 in the width direction D2 and a second sensor 16*b* located on a side of the second roller 14*a*2 in the width direction D2. In the examples of FIGS. 2A and 2B, the first sensor 16*a* and the second sensor 16*b* are located downstream of the transport roller 14*a*, but may be located upstream of the transport roller 14*a*.

When a document is detected by at least one of the first sensor 16*a* and the second sensor 16*b* after an instruction to start scanning is received, the first control section 11 may determine that a document is present, that is, "Yes" in step S100, and proceed to step S110. On the other hand, when a state in which neither the first sensor 16*a* nor the second sensor 16*b* detects a document continues for a predetermined time or more, that is, when it is determined that the next document does not exist, the first control section 11 may determine "No" in step S100 and end the flowchart of FIG. 3.

Several aspects can be considered for a period during which the transport section 14 is driven, that is, a period during which the rollers are rotated. The first control section 11 may drive the transport section 14 during a period from when an instruction to start scanning is received from a user to when "No" is determined in step S100. Alternatively, when a configuration includes a sensor that detects a document in a document tray as described above, the first control section 11 may drive the transport section 14 during a period from when the sensor detects a first sheet of the document to when the first control section 11 determines "NO" in step S100. Alternatively, the first control section 11 may drive the transport section 14 during a period from receiving an instruction to start scanning by a user to receiving an instruction to stop scanning by the user.

In step S110, the first control section 11 causes the reading section 15 to execute reading. As a result, image data 40 including a read result of a document is generated by the reading section 15. A reading setting by the reading section 15 in step S110 is predetermined, and bitmap data having gradation values in which each pixel is represented by 256 gradations for each of red (R), green (G), and blue (B) at a predetermined resolution in each of the transport direction D1 and the width direction D2 is obtained as the image data 40.

In step S120, the first control section 11 specifies a document region corresponding to a document from the image data 40 generated in step S110. Since the reading section 15 reads not only the transported document but also an area outside the document as long as the area is within a range of the reading section 15 in the width direction D2, the image data 40 includes a document region corresponding to the document and an outside-of-document region not corresponding to the document. Therefore, the first control section 11 specifies a document region. Specifying is also referred to as extraction. Specifying of the document region is a known technique, and thus details thereof will be omitted, but the first control section 11 specifies edges corresponding to four sides of a document in the image data 40, and specifies the region surrounded by the edges as the document region. A document region specified from the image data 40 is also referred to as document region image data.

In step S130, the first control section 11 adds document position information, which indicates a position of a document region in the image data 40, to document region image data. Document position information is an origin position of a document region, for example, coordinates of a corner that is on a downstream side and on a left side. Alternatively, document position information may be, for example, coordinates of the center position of a document region.

In step S140, the first control section 11 transmits document region image data to which document position information is added as described above to the reading control device 20 via the first communication IF 13. After step S140, the first control section 11 performs the determination of step S100. Since a plurality of document regions may be included in one image data 40, steps S120 to S140 are performed for each document region.

As described above, the image reading device 10 executes a transporting step of transporting a document in the transport direction D1 by the transport section 14 and a reading step of reading a document transported by the transporting step.

Figure 4:
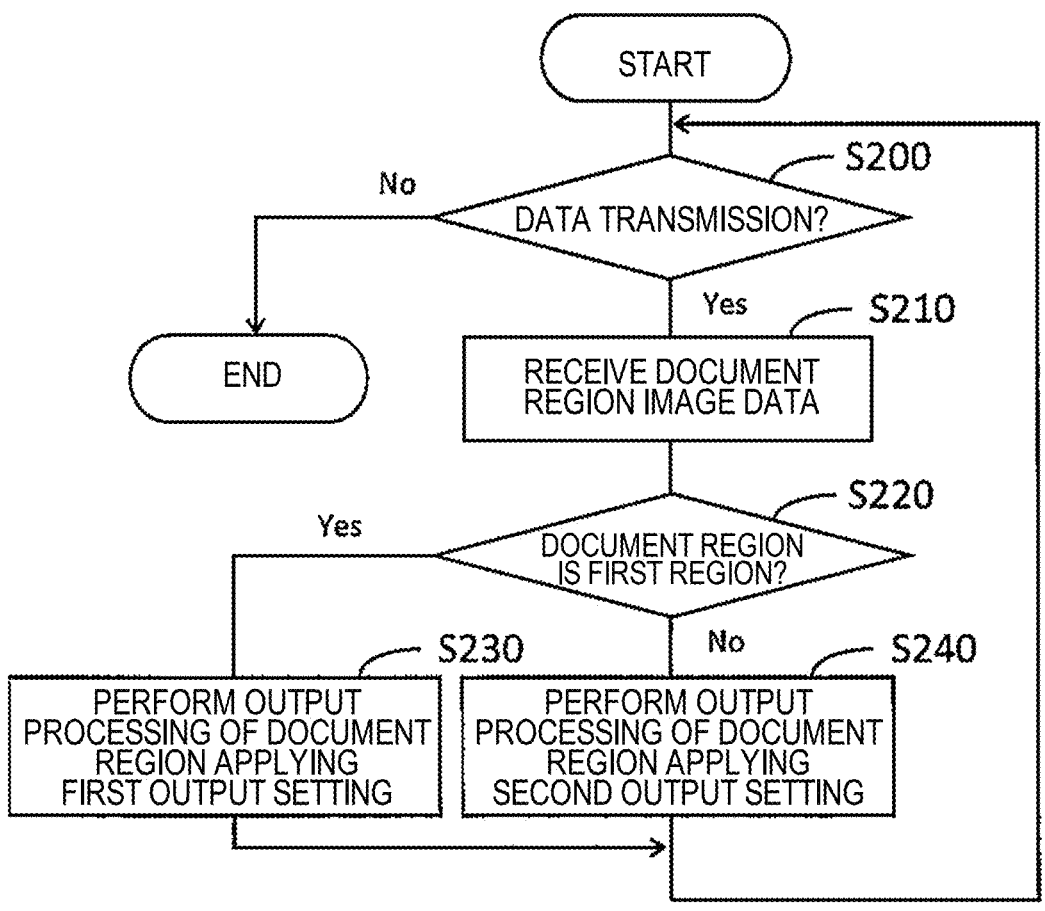
FIG. 4 is a flowchart showing a process executed by a reading control device.

FIG. 4 is a flowchart showing a process executed by the second control section 21 of the reading control device 20 in accordance with the second program 22.

In step S200, the second control section 21 determines whether or not there is a document region image data transmission from the image reading device 10 based on information received via the second communication IF 26 and, in a case where it is determined that there is a document region image data transmission, the process proceeds from "Yes" to step S210. On the other hand, when it cannot be determined that document region image data has been transmitted, the flowchart of FIG. 4 is ended from a determination of "No" in step S200.

In step S210, the second control section 21 receives document region image data for one sheet of the document via the second communication IF 26. As can be seen from the description of the flowchart of FIG. 3, when a plurality of sheets of the document are placed on a document tray, the processing of steps S110 to S140 are repeated for each sheet of document. Also in a case where a user manually feeds a plurality of sheets of the document to the transport roller 14a one by one or in a unit of several sheets, the processes of steps S110 to S140 are repeated. Considering such a situation, the second control section 21 repeats a determination of step S200 within a certain determination time in step S200, and determines "NO" when "Yes" cannot be determined within the determination time. The second control section 21 can naturally start the flowchart of FIG. 4 even after finishing the flowchart of FIG. 4.

In step S220, the second control section 21 determines whether or not the document region is included in a first region in the image data 40 based on document position information added to document region image data received in step S210.

Before describing step S220, "first region" and "second region", which are different regions in the image data 40, will be described. Each of a first region 41 and a second region 42 corresponds to a "divided region" in the image data 40. The first region 41 is a divided region corresponding to a first transport section side in the width direction D2, and the second region 42 is a divided region corresponding to a second transport section side in the width direction D2. Therefore, basically, a document region of a document transported and read by a first transport section belongs to the first region 41, and a document region of a document transported and read by a second transport section belongs to the second region 42.

Figure 5A:
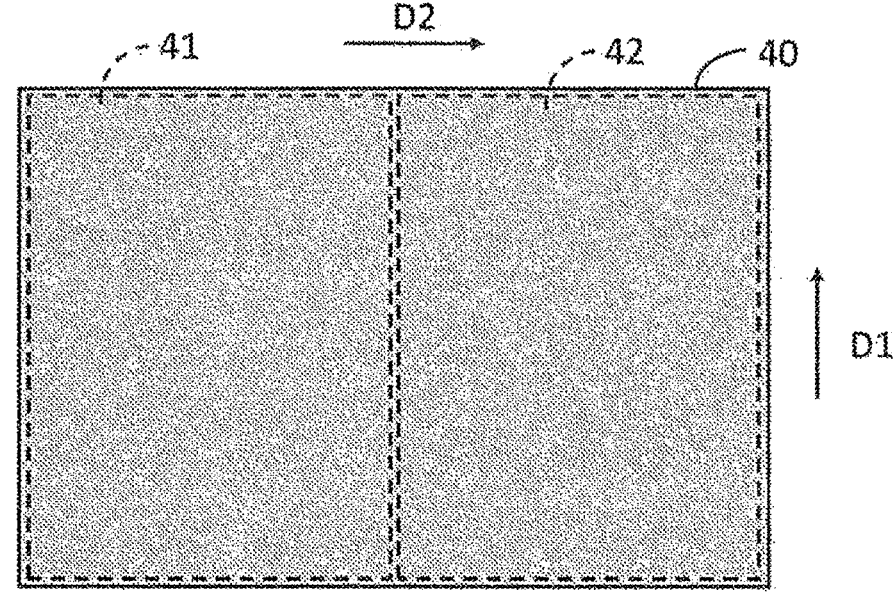
FIG. 5A is a diagram schematically showing a positional relationship between image data, a first region, and a second region.

FIG. 5A schematically shows a positional relationship between the image data 40 and the first region 41 and the second region 42. In FIG. 5A, the size of the image data 40 generated by the reading section 15 is indicated by a solid line frame, and the range of each of the first region 41 and the second region 42 in the image data 40 is indicated by a broken line frame. A correspondence relationship between the image data 40 and the directions D1 and D2 is also shown. The second control section 21 recognizes a setting of each divided region such as the first region 41 and the second region 42 in the image data 40 in advance. According to the example of FIG. 5A, the first region 41 and the second region 42 are defined by dividing the image data 40 into two in the width direction D2, and, simply put, the left half of the image data 40 is the first region 41 and the right half of the image data 40 is the second region 42.

Figure 5B:
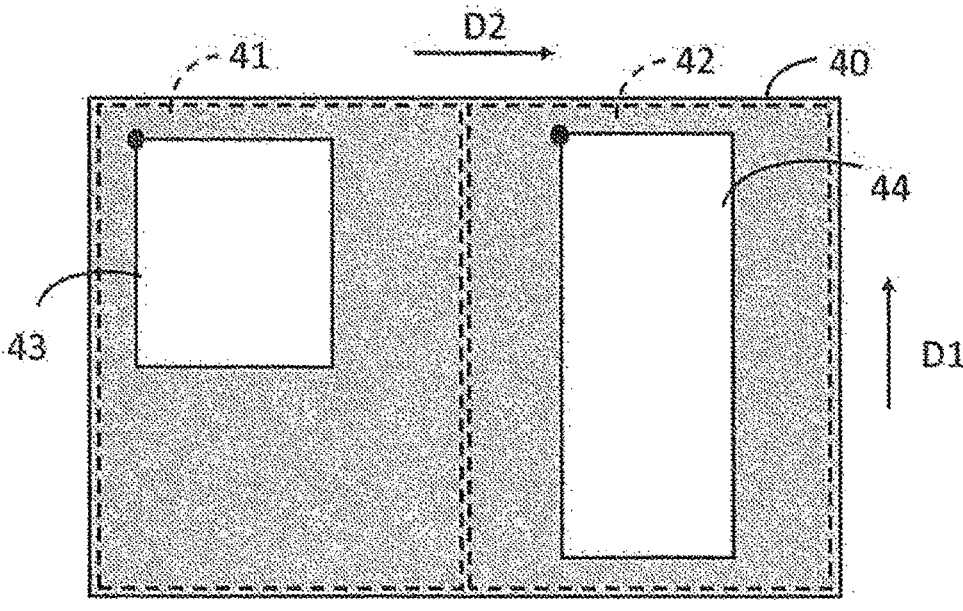
FIG. 5B is a diagram schematically showing a positional relationship between image data including a document region, the first region, and the second region.

FIG. 5B shows the image data 40 including document regions 43 and 44. Regarding FIG. 5B, description common to FIG. 5A will be omitted. The document region 43 and the document region 44 are examples of document regions specified in step S120. A gray range in FIG. 5B is an outside-of-document region in the image data 40. A black dot shown at downstream and left corner of the document region 43 is a coordinate indicated by document position information of the document region 43, and a black dot shown at downstream and left corner of the document region 44 is a coordinate indicated by document position information of the document region 44. In a case where determination is performed on the document region 43 in step S220, the second control section 21 determines that the document region 43 is included in the first region 41 since the document position information belongs to the first region 41. In a case where determination is performed on the document region 44 in step S220, the second control section 21 determines that the document region 44 is included in the second region 42 since the document position information belongs to the second region 42.

That is, according to settings of the first region 41 and the second region 42 shown in FIGS. 5A and 5B, in step S220, the second control section 21 determines "Yes" when document position information added to document region image data received in step S210 indicates that the document position information belongs to the first region 41, and proceeds to step S230. On the other hand, when document position information added to document region image data received in step S210 indicates that the document position information belongs to the second region 42, the second control section 21 determines "NO" in step S220, and proceeds to step S240.

Depending on the document region, the document region may extend over a plurality of divided regions. In consideration of such a situation, the control section may set a coordinate of a center position of a document region as document position information in step S130 and determine a divided region to which a center position belongs as a divided region including a document region in step S220.

In the present embodiment, as a premise for executing the flowchart in FIGS. 3 and 4, a correspondence relationship between each of a plurality of divided regions including the first region 41 and the second region 42, and an output setting applied to image data in an output process is stored in advance in the storage section 25. In the output process in step S230 or step S240, a part of the image data 40, that is, the document region, is converted into a file, and then output and saved to the designated output destination. For this reason, the output setting includes various items such as image quality, gradation value, file format, output destination, file name, and presence or absence of automatic rotation, and the like.

Image quality is vertical and horizontal resolution. Although resolution of the image data 40 is determined, the second control section 21 can maintain or change the resolution in accordance with an output setting. Gradation value is the number of colors for each pixel. In the image data 40, for example, the color of a pixel is expressed by 256 gradations for each of RGB, but the second control section 21 can maintain the color or convert the color into grayscale or black-and-white (binary) according to an output setting.

As a file format, in addition to bitmap, various formats such as JPEG, PNG, TIFF, and PDF can be selected. As an output destination, there are various options such as a folder secured in the storage section 25 or an external device with respect to the reading control device 20, a universal serial bus (USB) memory or various storages externally attached to the reading control device 20, a server 3 or a cloud service accessible through the network 2, and a destination of an e-mail. As a file name, for example, various settings such as a setting for generating a file name so as to include a specific character string related to business, a setting for generating a file name so as to include a specific character string related to private, and a setting for inputting a date are considered.

In any case, in the storage section 25, an output setting is associated with each of divided regions in advance. Among output settings stored in the storage section 25, an output setting associated with the first region 41 is referred to as a "first output setting", and among output settings stored in the storage section 25, an output setting associated with the second region 42 is referred to as a "second output setting". A first output setting and a second output setting are different from each other in at least a part of various settings such as image quality, gradation value, file format, output destination, and file name, and the like. For example, according to a first output setting, it is set to output to a color file of 200 dpi and 256 gradations to a first folder for business use, and according to a second output setting, it is set to output to a black-and-white file of 150 dpi to a second folder for private use.

In step S230, the second control section 21 refers to the storage section 25, applies a first output setting to a document region, and performs output processing on a document region. That is, a series of processes such as conversion of resolution or gradation value, conversion into a file, addition of a file name, and output to a designated output destination are performed in accordance with a first output setting on the document region image data. On the other hand, in step S240, the second control section 21 refers to the storage section 25, applies a second output setting to a document region, and performs output processing on a document region. The second control section 21 performs the determination of step S200 via step S230 or step S240. According to FIGS. 3 and 4, an image reading method includes an outputting step of outputting the image data 40 that was generated in a reading step to the designated output destination. Outputting the image data 40 naturally means outputting at least a part of the image data 40.

A correspondence relationship between a divided region of the image data 40 and an output setting may be arbitrarily edited by a user. The timing and the number of editings are not particularly limited. The second control section 21 can set the number of divided regions and a range of each divided region in the image data 40 in accordance with an operation by a user.

Figure 6A:
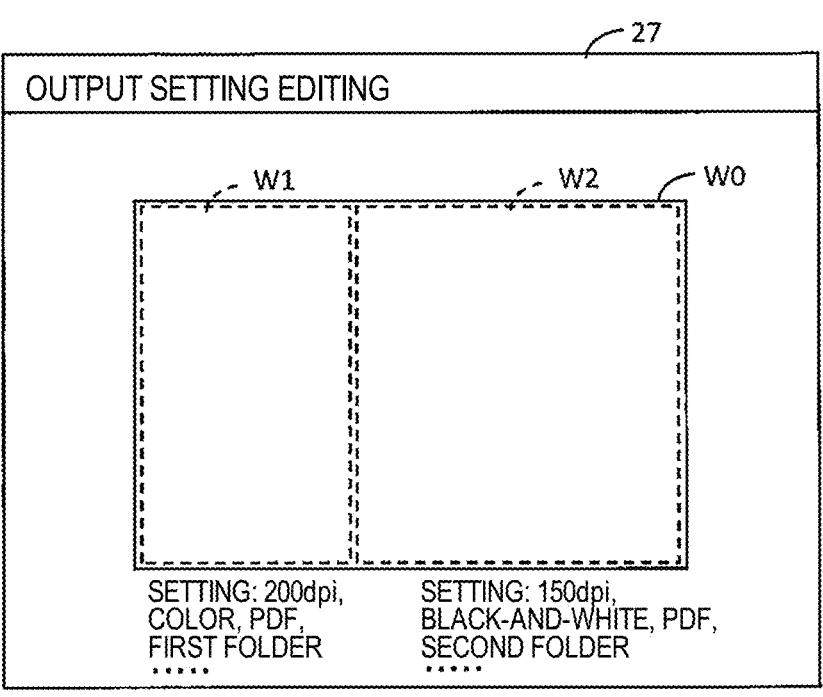
FIG. 6A is a diagram showing an example of a UI screen.
Figure 6B:
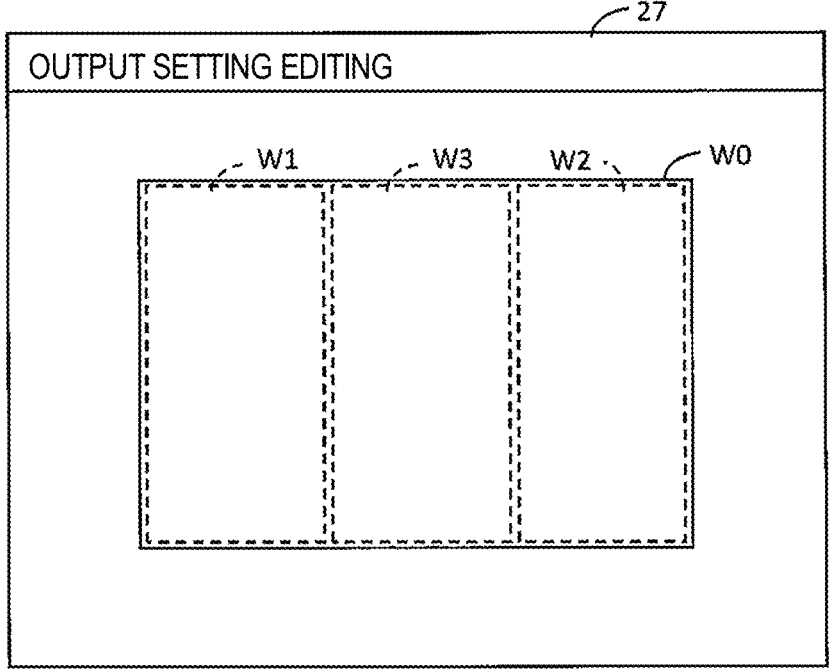
FIG. 6B is a diagram showing an example of the UI screen.

FIGS. 6A and 6B each show a UI screen 27 displayed on the display section 23. UI is an abbreviation for user interface. A user can perform an operation on the UI screen 27 through the operation receiving section 24. As shown in FIGS. 6A and 6B, an entire frame W0 simulating the entire range of the image data 40 generated by the reading section 15 is displayed on the UI screen 27, and a first frame W1 simulating a range of the first region 41 and a second frame W2 simulating a range of the second region 42 are displayed in the entire frame W0. As described above, the second control section 21 causes the display section 23 to display an aspect of division of a plurality of divided regions in the image data 40.

It is assumed that the first region 41 and the second region 42 are initially set in a state where the first region 41 and the second region 42 divide the image data 40 into two equal parts in the width direction D2 as shown in FIGS. 5A and 5B. With respect to such initial setting, a user may or may not change the widths of the first frame W1 and the second frame W2. In the example of FIG. 6A, the sizes of the first frame W1 and the second frame W2 are not uniform. That is, the sizes of the first region 41 and the second region 42 can be made different. By operating the UI screen 27, the user can add a third frame W3 to the entire frame W0 as shown in FIG. 6B, and change the widths of the first frame W1, the second frame W2, and the third frame W3.

The third frame W3 simulates a "third region" which is a divided region different from both the first region 41 and the second region 42, and is present between the first frame W1 and the second frame W2. When a user performs a predetermined operation to determine the number and the range of a plurality of frames in the entire frame W0, the second control section 21 accepts the number and the range of the frames at that time as a setting of the number and the range of the divided regions in the image data 40, and adopts the setting thereafter. A user may set four or more frames, that is, divided regions.

A user can edit an output setting for each frame, that is, for each divided region, through an operation such as selection on a menu (not shown) on the UI screen 27. In the example of FIG. 6B, a user edits output settings associated with the first frame W1, the second frame W2, and the third frame W3, that is, first to third regions and, according to such an edited result, the second control section 21 overwrites content of output settings for each divided region in the storage section 25. In step S230 and step S240, the latest output setting for each divided region stored in the storage section 25 is applied.

The second control section 21 can cause the display section 23 to display at least a part of the content of an output setting associated with each divided region. In the example of FIG. 6A, on the UI screen 27, in the vicinity of each of the first frame W1 and the second frame W2, a part or all of the output settings corresponding to the first frame W1, that is, the first region 41, and a part or all of the output settings corresponding to the second frame W2, that is, the second region 42, are displayed. Although omitted in FIG. 6B, a part or all of the corresponding output settings can be displayed on the UI screen 27 in the vicinity of each of the first frame W1, the second frame W2, and the third frame W3. Needless to say, the design of the UI screen 27 is not limited to the shown example. The display of each piece of information by the display section 23 in the present embodiment can be realized in various aspects, for example, by scrolling a screen or switching a screen to another screen.

As described above, the storage section 25 also stores an output setting in association with the third region. An output setting associated with a third region is referred to as a "third output setting". A third output setting is different from a first output setting and a second output setting in at least a part of contents. Therefore, when the second control section 21 determines that a document region is included in a third region, the second control section 21 applies a third output setting to the document region and executes output for the document region. In step S220 of FIG. 4, in order to simplify the description, it is determined that a document region is not included in the first region 41 but is included in the second region 42, but to be precise, in step S220, it is determined which divided region includes a document region based on document position information added to document region image data. When the second control section 21 determines that a document region is included in a third region, the second control section 21 performs an output process on the document region by applying a third output setting to the document region, as a step different from steps S230 and S240, while referring to the storage section 25, and thereafter, the process proceeds to step S200.

4. Synopsis

As described above, according to the present embodiment, the image reading system 1 includes the transport section 14 configured to transport a document in a predetermined transport direction D1, the reading section 15 configured to read the document transported by the transport section 14, and a control section configured to output image data 40 that was generated by reading by the reading section 15 to a designated output destination. The transport section 14 includes a first transport section and a second transport section at different positions in the intersecting direction D2, which intersects the transport direction D1, and the image reading system 1 includes the storage section 25 configured to store a correspondence relationship between each of a plurality of divided regions that are different regions of the image data 40 and that include the first region 41 corresponding to a side of the first transport section in the intersecting direction D2 and the second region 42 corresponding to a side of the second transport section in the intersecting direction D2, and an output setting applied to the image data 40 during a process for output. The control section extracts a document region corresponding to the document from the image data 40, determines which of the divided regions includes the document region, when the control section determines that the document region is included in the first region 41, applies a first output setting associated with the first region 41 among the output settings stored in the storage section 25 to the document region to execute the output for the document region, and when the control section determines that the document region is included in the second region 42, applies a second output setting associated with the second region 42 among the output settings stored in the storage section 25 to the document region to execute the output for the document region.

According to such a configuration, a user can switch a setting related to the output process after a document is read by changing the position in the intersecting direction D2 of the document to be transported by the transport section 14. Therefore, when using the sheet feed type image reading device 10, a user's labor required for such switching is reduced, and the usability for the user is improved.

According to the present embodiment, the storage section 25 may store a third region, which is a divided region different from both the first region 41 and the second region 42, and a third output setting, as the output setting, in association with each other, and when the control section determines that the document region is included in the third region, the control section may apply the third output setting to the document region to execute the output for the document region.

According to the configuration, by changing a position in the intersecting direction D2 of the document to be transported by the transport section 14, a user can switch, from among more options, a setting related to an output process after reading a document.

According to the present embodiment, the control section may set the number of divided regions in the image data 40 and a range of each of the divided regions in accordance with an operation by a user.

According to the configuration, since a user can determine the number of divided regions and a range of each of the divided regions in accordance with the size and the type of a document to be read, it is possible to more efficiently perform an operation of scanning, outputting, and saving each document.

According to the present embodiment, the image reading system 1 may include the display section 23 configured to display visual information, and the control section may cause the display section 23 to display an aspect of division of a plurality of divided regions in the image data 40.

According to the configuration, since a user can check the number of divided regions and the range of each of the divided regions by viewing the display section 23, it is possible to avoid an error in a setting position of a document in the intersecting direction D2.

According to the present embodiment, the control section may cause the display section 23 to display at least a part of contents of the output setting associated with each of the divided region.

According to the configuration, not only a user can check the number of divided regions and the range of each divided region by viewing the display section 23, it is also possible to check an output setting for each divided region.

5. Other Embodiments

Various application examples included in the present embodiment will be further described. Naturally, combinations of various application examples are also included in the present embodiment.

First Application Example

The first output setting may be a setting for generating and outputting one file for each document region in one sheet of document, and the second output setting may be a setting for outputting document regions of a plurality of sheets of the document collectively into a single file. That is, in step S230, the second control section 21 generates one file in accordance with the first output setting for each set of document region image data corresponding to one sheet of the document received in step S210, and outputs the file to a designated output destination.

On the other hand, in step S240, in accordance with the second output setting, the second control section 21 performs a process of combining files for each set of document region image data corresponding to one sheet of the document received in step S210 into one file. That is, the document region image data of a plurality of sheets of the document that was received between a determination of "Yes" in step S200 and a determination of "No" in step S200, and that is document region image data from a "No" determination in step S220, are combined into one file in step S240. In this case, the second control section 21 may output a file finally generated in the previous step S240 to an output destination in accordance with the second output setting at the timing when the determination is "No" in step S200.

According to the first application example, a user can switch whether to generate a file of a document unit or to generate a file in which a plurality of sheets of the document are combined, depending on a position of the document in the width direction D2. By causing the reading section 15 to continuously read a plurality of sheets of the document at a position corresponding to the second region 42 in the width direction D2, the read results of the plurality of sheets of the document can be combined into one file and output to a desired output destination.

Second Application Example

As described above, the image reading device 10 is provided with the first sensor 16*a* and the second sensor 16*b*. The control section may determine that the document region is included in the first region 41 when the document is detected by the first sensor 16*a*, and may determine that the document region is included in the second region 42 when the document is detected by the second sensor 16*b*. Specifically, in step S130, the first control section 11 adds document position information, which indicates that the document region belongs to the first region 41, to the document region that was specified from the image data 40 generated by reading that was executed after the document is detected by the first sensor 16*a*. Further, in step S130, the first control section 11 adds document position information, which indicates that the document region belongs to the second region 42, to the document region specified from the image data 40 that was generated by reading executed after the document is detected by the second sensor 16*b*.

Then, in step S220, the second control section 21 may determine "Yes" for the document region image data to which is added the document position information indicating that the document region belongs to the first region 41 and then proceed to step S230, and the second control section 21 may determine "No" for the document region image data to which is added the document position information indicating that the document region belongs to the second region 42 and then proceed to step S240.

According to the second application example, since the control section can directly use a result of a document detection by the first sensor 16*a* or by the second sensor 16*b* to determine which divided region includes a document region, it is possible to reduce the amount of processing in each flowchart.

However, depending on the size and position of a document in the width direction D2, the image data 40 may be generated in a state where the first sensor 16*a* and the second sensor 16*b* detect the document simultaneously or substantially simultaneously, or conversely, the image data 40 may be generated in a state where neither the first sensor 16*a* nor the second sensor 16*b* detects the document. In such a case, as described above, the control section may specify document position information of a document region from the image data 40 and add the document position information to the document region image data in step S130, and perform the determination in step S220.

Third Application Example

When the document region includes specific information indicating that the document is a setting sheet for changing the output setting, the control section may not determine which of the divided regions includes the document region, but may acquire the first output setting after change and the second output setting after change from the document region, may update the first output setting stored in the storage section 25 with the first output setting after the change, and may update the second output setting stored in the storage section 25 with the second output setting after the change.

Figure 7:
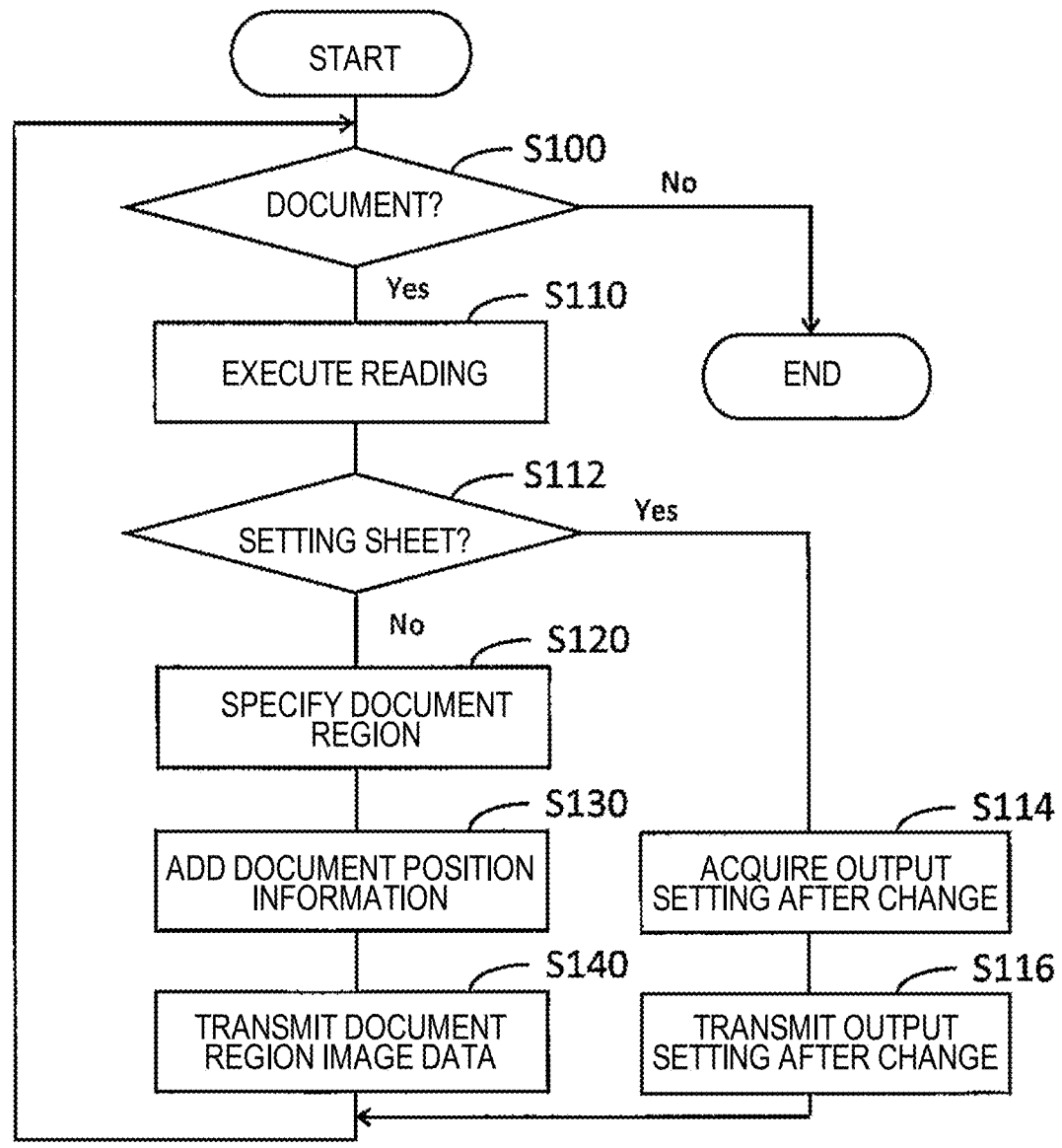
FIG. 7 is a flowchart for explaining a third application example.

FIG. 7 is a flowchart for explaining a third application example. FIG. 7 is different from the flowchart of FIG. 3 in that FIG. 7 includes step S112, S114, and S116. Following step S110, in step S112, the first control section 11 analyzes the image data 40 generated in step S110 to specify a document region and determines whether or not a read document is a setting sheet.

A user can cause the transport section 14 to transport a setting sheet in the same manner as a document to be scanned and cause the reading section 15 to read the setting sheet. On a setting sheet, a predetermined specific mark or a predetermined specific character string is printed as specific information indicating the setting sheet. Information indicating a first output setting after change and a second output setting after change is printed or described on a setting sheet. Information indicating a first output setting after change and a second output setting after change may be information of any form as long as the control section can recognize the first output setting after change and the second output setting after change as a result. For example, information indicating a first output setting after change and a second output setting after change may be a character string in which the first output setting after the change and the second output setting after the change are directly described, or may be information in a optical mark recognition sheet format in which options after change related to each item of an output setting are filled. Of course, information indicating a first output setting after change and a second output setting after change may be a series of numbers, a barcode, a two dimensional code, or the like.

When the specific information indicating a setting sheet can be detected from a document region, the first control section 11 determines "Yes" in step S112, and proceeds to step S114. On the other hand, when the specific information indicating a setting sheet cannot be detected from a document region, the first control section 11 determines "No" in step S112, and proceeds to step S120. The processing after step S120 is as described above.

In step S114, the first control section 11 acquires information indicating a first output setting after change and a second output setting after change from a read image of the document region, that is, of the setting sheet. Then, in step S116, the first control section 11 transmits information indicating a first output setting after change and a second output setting after change acquired in step S114 to the reading control device 20 via the first communication IF 13. After step S116, the first control section 11 performs determination in step S100.

Although not shown, in the reading control device 20 that has received information indicating a first output setting after change and a second output setting after change via the second communication IF 26, the second control section 21 updates a first output setting and a second output setting stored in the storage section 25 with the first output setting after change and the second output setting after change. Needless to say, the second control section 21 can interpret the contents of the received information indicating a first output setting after change and a second output setting after change by performing optical character recognition (OCR) on the information or decoding the information as necessary.

According to the third application example, a user can update a first output setting and a second output setting by causing the transport section 14 to transport a setting sheet in the same manner as a document to be scanned and causing the reading section 15 to read the setting sheet. Accordingly, it is possible to omit an operation of editing an output setting for each divided region by operating a UI screen or the like. Needless to say, an output setting that can be updated by a setting sheet is not only a first output setting and a second output setting, but also an output setting for each divided region including a third output setting.

Fourth Application Example

The storage section 25 stores a card or receipt output setting as an output setting. Then, in a case where the size of a document region corresponds to the size of a specific card or the size of a specific receipt, the control section may apply the card or receipt output setting to the document region and execute the output for the document region without executing determination of which divided region includes the document region.

A card or receipt output setting is an output setting suitable for outputting or saving a document region when a document is a card or a receipt, and is determined in advance by a user, for example. The card or receipt output setting may be coincidentally the same as or different from other output settings such as a first output setting and a second output setting.

Figure 8:
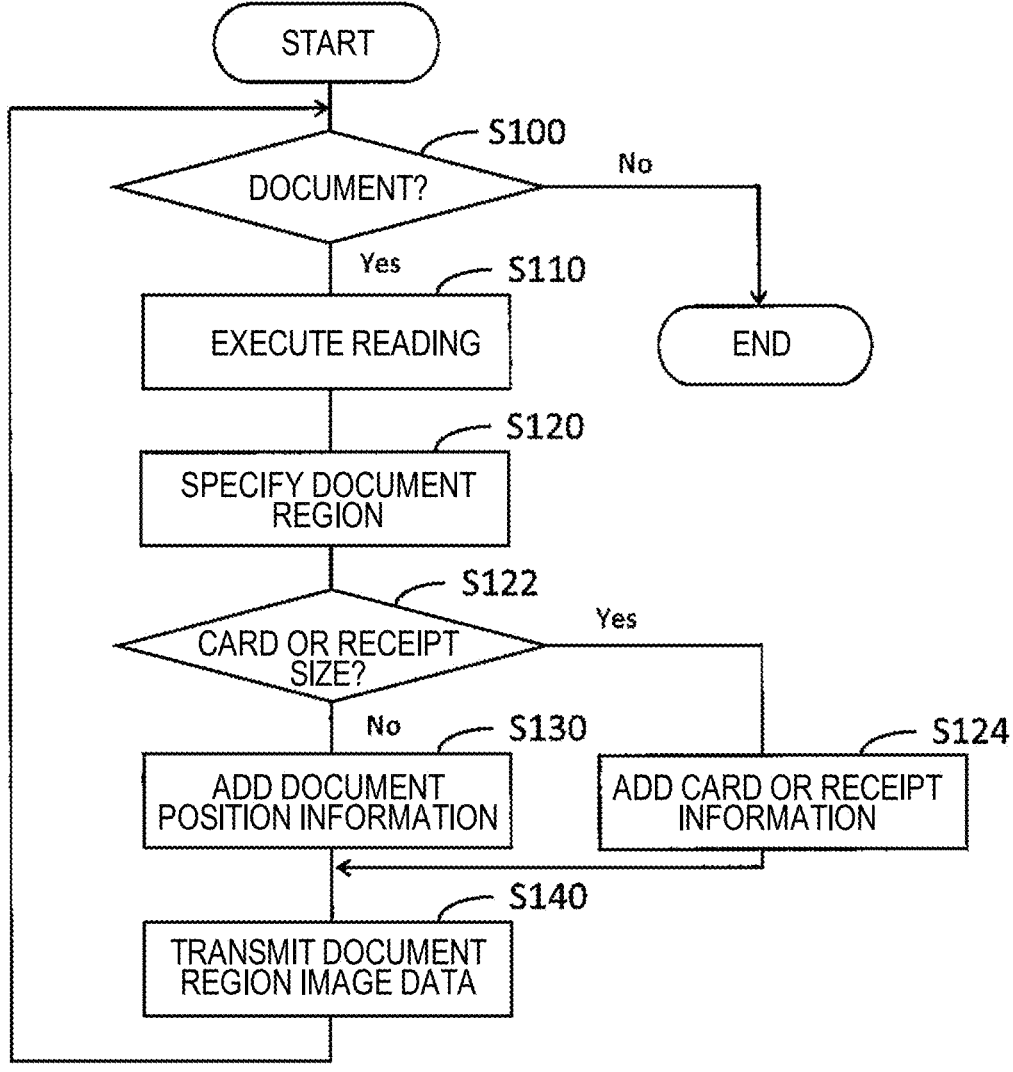
FIG. 8 is a flowchart for explaining a process on an image reading device side of a fourth application example.
Figure 9:
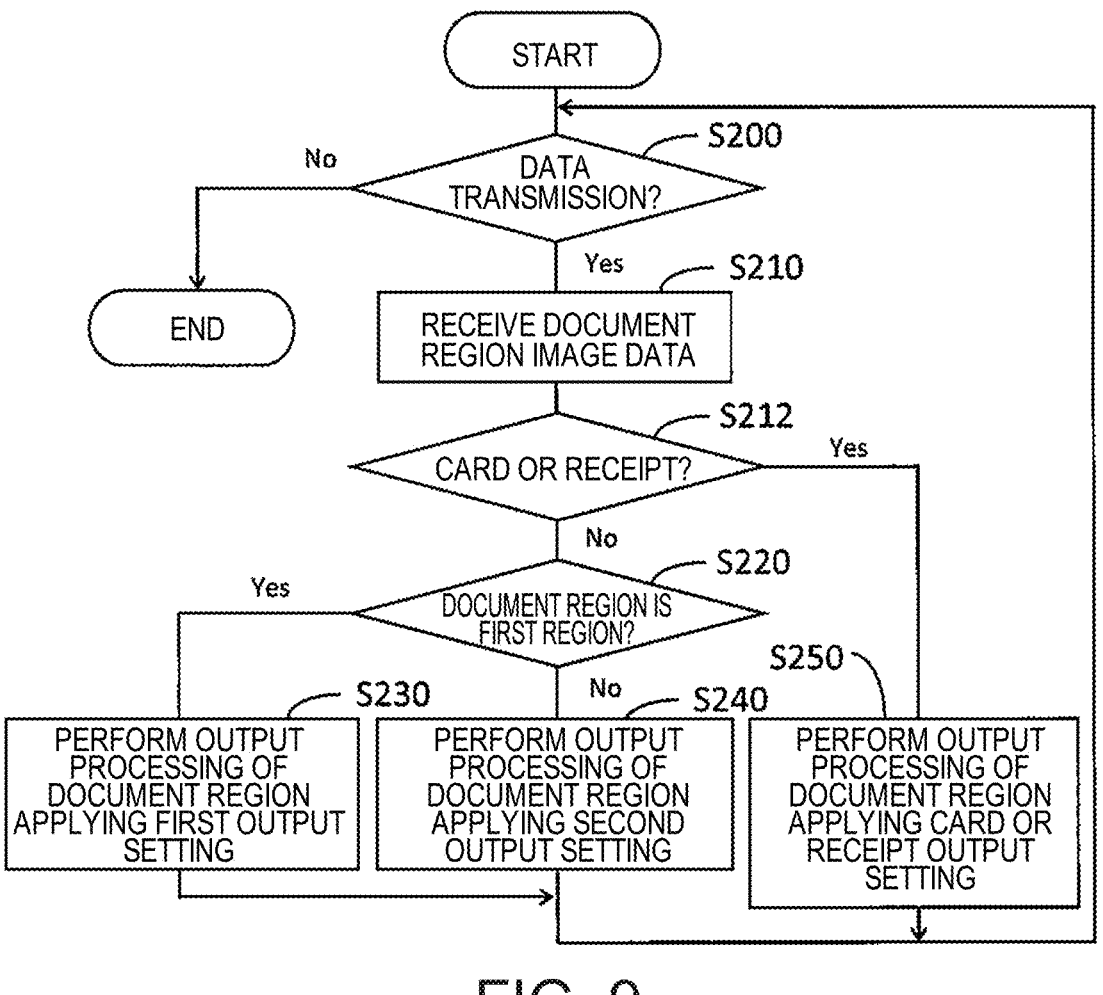
FIG. 9 is a flowchart for explaining a process on a reading control device side of the fourth application example.

FIGS. 8 and 9 are flowcharts for explaining a fourth application example. FIG. 8 is different from the flowchart of FIG. 3 in that steps S122 and S124 are included. FIG. 9 is different from the flowchart of FIG. 4 in that steps S212 and S250 are included.

Following step S120, in step S122, the first control section 11 determines whether or not the size of a document region corresponds to the size of a specific card or the size of a specific receipt. It is sufficient to convert the size of a document region into an actual length based on the number of pixels and the resolution in the image data 40. The size of a specific card refers to the size of cards such as business cards, identification cards, plastic cards, and the like. Since the size of these cards is generally determined by a standard or the like, the first control section 11 includes information on the size of a specific card in advance. The first control section 11 also includes information on the size of a specific receipt in advance.

The first control section 11 compares the size of a document region with each of the size of a specific card and the size of a specific receipt, and in a case where the size of the document region corresponds to any one of the size of the specific card and the size of the specific receipt, the first control unit 11 determines "Yes" in step S122 and proceeds to step S124. On the other hand, in a case where the size of a document region does not correspond to either the size of a specific card or the size of a specific receipt, the first control section 11 determines "No" in step S122, and proceeds to step S130. The processing after step S130 is as described above.

When determining whether or not the size of a document region corresponds to the size of a specific card or a specific receipt, the first control section 11 may determine by comparing only the length of the long side, or may determine by comparing only the length of the short side, or may determine by comparing both the length of the long side and the length of the short side. In this comparison, a certain degree of difference in length may be allowed for the determination.

In step S124, the first control section 11 adds card or receipt information indicating that a document corresponds to a card or a receipt to document region image data. Card or receipt information may be information for indicating whether a document corresponds to a card or a receipt. In step S140 after step S124, the first control section 11 transmits document region image data to which card or receipt information is added instead of document position information to the reading control device 20 via the first communication IF 13.

In step S212 subsequent to step S210, the second control section 21 determines whether or not a document is a card or a receipt. That is, if card or receipt information is added to document region image data received in step S210, "Yes" is determined in step S212, and the process proceeds to step S250. On the other hand, if the card or receipt information is not added to the document region image data received in step S210, "No" is determined in step S212, and the process proceeds to step S220. The processing after step S220 is as described above. In step S250, the second control section 21 refers to the storage section 25, applies a card or receipt output setting to the document region, and performs output processing on the document region. After step S250, the process proceeds to step S200.

According to a fourth application example, the control section can execute an output process by applying an output setting suitable for a card or a receipt without executing the determination of which divided region includes a document region with respect to a document which can be determined as a card or a receipt from the size. In the image reading device 10, when the size of a document can be detected by a sensor located upstream of the reading section 15, the control section may perform the determination in step S122 using the size of the document thus detected. In addition, a card or receipt output setting may be divided into an output setting corresponding to a card and an output setting corresponding to a receipt and when, in step S250, card or receipt information added to document region image data indicates a card, the control section may apply an output setting corresponding to a card to the document region and when, in step S250, card or receipt information added to document region image data indicates a receipt, the control section may apply an output setting corresponding to a receipt to a document region.

Fifth Application Example

In the above description, it is assumed that the reading section 15 reads one side of a document, but the reading section 15 may be a unit capable of reading both sides of a document. That is, the reading section 15 reads a first surface of a document to generate first image data as image data, and reads a second surface of the document, which is a back surface of the first surface, to generate second image data as image data. Since the configuration of the reading section 15 for reading both sides of a transported document is known, the details are omitted, but by providing image sensors at the upper and lower positions sandwiching the document, both sides of the document, that is, the first surface and the second surface, can be read simultaneously.

The surfaces of the documents 30 and 31 seen from the viewpoints of FIGS. 2A and 2B in the drawing, that is, the upper surfaces, are regarded as first surfaces of the documents, and the back sides of the upper surfaces, that is, the lower surfaces, are regarded as second surfaces. Therefore, according to the above description, the storage section 25 stores the first region 41 of first image data and a first output setting in association with each other, and the second region 42 of first image data and a second output setting in association with each other. In a fifth application example, the storage section 25 further stores the first region 41 of second image data and a fourth output setting as an output setting in association with each other, and the second region 42 of second image data and a fifth output setting as an output setting in association with each other. It may be understood that a fourth output setting and a fifth output setting are also different from the other output settings such as a first output setting and a second output setting in at least a part of their contents. The first region 41 of first image data and the first region 41 of second image data are in a relationship of being directly opposite to each other. Similarly, the second region 42 of first image data and the second region 42 of second image data are in a relationship of being directly opposite to each other.

In such a situation, when determining that a document region extracted from first image data is included in the first region 41, the control section executes outputting by applying a first output setting to the document region (step S230), and when determining that a document region extracted from first image data is included in the second region 42, the control section executes outputting by applying a second output setting to the document region (step S240). This is as has been explained. Further, when the control section determines that a document region extracted from second image data is included in the first region 41, the control section executes the output by applying a fourth output setting to the document region, and when the control section determines that a document region extracted from second image data is included in the second region 42, the control section executes the output by applying a fifth output setting to the document region. That is, with respect to a document region specified from second image data, when "Yes" is determined in step S220, output processing to which a fourth output setting is applied is performed, and when "No" is determined in step S220, output processing to which a fifth output setting is applied is performed. According to a fifth application example, in addition to the difference in a position in the width direction D2 portion of a document, it is also possible to make an output setting different due to the difference between a first surface and a second surface of the document, and thus, the convenience of a user is further improved.

6. Specific Example of Output Setting

Various specific examples of the contents of the output setting have already been described, and the contents will be further supplemented.

As described above, at least one of the differences between a first output setting and a second output setting can be the difference in a folder as an output destination. Furthermore, the control section can execute scan to e-mail for transmitting an e-mail, to which a file of a document region is attached, to an e-mail address as a predetermined destination via the second communication IF 26 and the network 2. Therefore, as an example, a first output setting may be a setting for outputting a file of a document region to a predetermined folder, and a second output setting may be a setting for transmitting the file to the outside by scan to e-mail.

The control section can execute scan-to-cloud in which a file of a document region is transmitted to a predetermined cloud service that provides a file storage location on a cloud via the second communication IF 26 and the network 2. As an example, a first output setting may be a setting for outputting a file of a document region to a predetermined folder, and a second output setting may be a setting for outputting the file by scan-to-cloud.

The control section can output information to a business card management application, which is software for managing various kinds of information such as company name, name, and contact address described on a business card. The location of a business card management application may be in the storage section 25, may be an external device (not shown) capable of communication, or may be in the server 3 accessible through the network 2. A business card management application that can be accessed through the network 2 that includes the Internet can also be regarded as a type of cloud service. Therefore, as an example, a first output setting may be a setting for outputting a document region to a predetermined business card management application, and a second output setting may be a setting for setting an output destination of a document region to an output destination other than the business card management application. In this case, a user can cause a business card management application to manage information of a business card by causing the business card to be transported and read at a position corresponding to the first region 41.

A business card management application automatically manages character information contained in a document region item by item. A business card management application can also save the entire image of a document region. The character information in a document region necessary for a business card management application may be extracted by the control section using OCR and then output to the business card management application, or may be a mechanism in which the character information in a document region is extracted from a file in a document region by the business card management application using OCR.

The control section can output information to an accounting application, which is software for managing various kinds of information such as store name, date, amount of money, tax amount, and currency described in a receipt. The location of an accounting application may be in the storage section 25, may be an external device (not shown) capable of communication, or may be in the server 3 accessible through the network 2. An accounting application that can be accessed through the network 2 that includes the Internet can also be regarded as a type of cloud service. Therefore, as an example, a first output setting may be a setting for outputting a document region to a predetermined accounting application, and a second output setting may be a setting for setting an output destination of a document region to an output destination other than the accounting application. In this case, a user can cause an accounting application to manage information of a receipt by causing the receipt to be transported and read at a position corresponding to the first region 41.

An accounting application automatically manages character information contained in a document region item by item. An accounting application can also save the entire image of a document region. The character information in a document region necessary for an accounting application may be extracted by the control section using OCR and then output to the accounting application, or may be a mechanism in which the character information in a document region is extracted from a file in a document region by the accounting application using OCR.

The control section can output information to an e-mail address DB, which is a database for registering an e-mail address. The location of an e-mail address DB may be in the storage section 25, may be an external device (not shown) capable of communication, or may be in the server 3 accessible through the network 2. Therefore, as an example, a first output setting may be a setting in which a character string corresponding to an e-mail address included in a document region is output to and registered in the e-mail address DB, and a second output setting may be a setting in which an output destination of a document region is set to an output destination other than the e-mail address DB. The extraction of a character string corresponding to an e-mail address from a document region may be executed by the control section, or may be executed by an external device or the server 3 including the e-mail address DB. The extraction of a character string corresponding to an e-mail address is the extraction of a character string containing a predetermined character or symbol characteristic of an e-mail address. A user can register an e-mail address in an e-mail address DB by transporting and reading the document on which the e-mail address is printed at a position corresponding to the first region 41.

A first output setting may be a setting in which a name including a character string extracted from a document region is set as a file name, and a second output setting may be a setting in which a name not including a character string in a document region is set as a file name. Alternatively, a first output setting may be a setting in which a first name including a character string extracted from a document region is set as a file name, and a second output setting may be a setting in which a second name including a character string extracted from a document region and different from the first name is set as a file name.

In the scope of claims, only a part of combinations of claims are described, but the present embodiment includes not only one-to-one combinations of independent claims and dependent claims, but also various combinations of plural dependent claims within the range disclosed.

In addition to the image reading system 1, the present embodiment discloses a device, a method, and a program for realizing the method in cooperation with a processor.

That is, the image reading device 10 includes the transport section 14 configured to transport a document in the predetermined transport direction D1, the reading section 15 configured to read the document transported by the transport section 14, and the control section configured to output image data generated by reading by the reading section 15 to a designated output destination, wherein the transport section 14 includes a first transport section and a second transport section at different positions in the intersecting direction D2, which intersects the transport direction D1. The image reading device 10 includes the storage section 25 configured to store a correspondence relationship between each of a plurality of divided regions that are different regions of the image data and that include the first region 41 corresponding to a side of the first transport section in the intersecting direction D2 and the second region 42 corresponding to a side of the second transport section in the intersecting direction D2 and an output setting applied to the image data during a process for output, and the control section extracts a document region corresponding to the document from the image data, determines which of the divided regions includes the document region, when the control section determines that the document region is included in the first region 41, applies a first output setting associated with the first region 41 among the output settings stored in the storage section 25 to the document region to execute the output for the document region, and when the control section determines that the document region is included in the second region 42, applies a second output setting associated with the second region 42 among the output settings stored in the storage section 25 to the document region to execute the output for the document region.

The image reading method includes a transporting step of transporting a document in the predetermined transport direction D1 by the transport section 14, a reading step of reading the document transported in the transporting step; and an outputting step of outputting image data generated in the reading step to a specified output destination. The transport section 14 includes a first transport section and a second transport section at different positions in the intersecting direction D2 intersecting the transport direction D1 and in the outputting step, extracting a document region corresponding to the document from the image data, determining which of a plurality of divided regions including the first region 41 corresponding to a side of the first transport section in the intersecting direction D2 and the second region 42 corresponding to a side of the second transport section in the intersecting direction D2 the document region is included, which are different regions of the image data, referring to the storage section 25 that stores a correspondence relationship between each of the plurality of divided regions and an output setting to be applied to the image data during a process for the output when determining that the document region is included in the first region 41, applying a first output setting, which is among the output settings and is associated with the first region 41, to the document region to execute the output for the document region, and referring to the storage section 25 when determining that the document region is included in the second region 42, applying a second output setting, which is among the output settings and is associated with the second region 42, to the document region to execute the output for the document region.

The features of the present embodiment are also applicable to a flatbed type image reading device that generates image data by reading a document placed on a document placement section by an image sensor without transporting a document. That is, a correspondence relationship between a plurality of divided regions in image data corresponding to a range of a document placement section and an output setting is stored in advance, and an output setting associated with a divided region including a document region can be applied to the document region in image data to perform the output. It is possible to define a divided region assuming such a document placement section by dividing the document placement section in both a horizontal direction and a vertical direction.

What is claimed is:

1. An image reading system comprising:
a transport section configured to transport a document in a predetermined transport direction;
a reading section configured to read the document transported by the transport section; and
a control section configured to output image data generated by reading by the reading section to a designated output destination, wherein
the transport section includes a first transport section and a second transport section at different positions in an intersecting direction intersecting the transport direction,
the image reading system includes a storage section configured to store a correspondence relationship between each of a plurality of divided regions, which are different regions of the image data and which include a first region corresponding to the first transport section side in the intersecting direction and a second region corresponding to the second transport section side in the intersecting direction, and output settings applied to the image data during a process for output, and
the control section

23 extracts a document region corresponding to the document from the image data, determines which of the divided regions includes the document region, when the control section determines that the document region is included in the first region, applies a first output setting associated with the first region among the output settings stored in the storage section to the document region to execute the output for the document region, when the control section determines that the document region is included in the second region, applies a second output setting associated with the second region among the output settings stored in the storage section to the document region to execute the output for the document region, and when the document region includes specific information indicating that the document is a setting sheet for changing the output setting, the control section does not determine which of the divided regions includes the document region, acquires the first output setting after change and the second output setting after change from the document region, updates the first output setting stored in the storage section with the first output setting after the change, and updates the second output setting stored in the storage section with the second output setting after the change.

2. The image reading system according to claim 1, wherein the first output setting is a setting for generating and outputting one file for each document region of one sheet of the document and the second output setting is a setting for outputting document regions of a plurality of sheets of the document collectively into a single file.

3. The image reading system according to claim 1, further comprising:

a first sensor that is located upstream of the reading section in the transport direction, is configured to detect the document, and is located on the first transport section side in the intersecting direction and a second sensor that is located upstream of the reading section in the transport direction, is configured to detect the document, and is located on the second transport section side in the intersecting direction, wherein the control section determines that the document region is included in the first region when the document is detected by the first sensor, and determines that the document region is included in the second region when the document is detected by the second sensor.

4. The image reading system according to claim 1, wherein the storage section stores, in association with each other, a third region that is the divided region different from both the first region and the second region and a third output setting as the output setting and when the control section determines that the document region is included in the third region, the control section applies the third output setting to the document region to execute the output for the document region.

5. The image reading system according to claim 1, wherein the control section sets a number of the divided regions in the image data and a range of each of the divided regions in accordance with an operation by a user.

6. The image reading system according to claim 1, wherein the storage section stores a card or receipt output setting as the output setting and when a size of the document region corresponds to a size of a specific card or a size of a specific receipt, the control section does not determine which of the divided regions includes the document region, and applies the card or receipt output setting to the document region to execute the output for the document region.

7. The image reading system according to claim 1, wherein the reading section reads a first surface of the document to generate first image data as the image data, and reads a second surface, which is a back surface of the first surface of the document, to generate second image data as the image data, the storage section stores the first region of the first image data and the first output setting in association with each other, the second region of the first image data and the second output setting in association with each other, the first region of the second image data and a fourth output setting as the output setting in association with each other, and the second region of the second image data and a fifth output setting as the output setting in association with each other, and when the control section determines that the document region extracted from the first image data is included in the first region, the control section applies the first output setting to the document region to execute the output, when the control section determines that the document region extracted from the first image data is included in the second region, applies the second output setting to the document region to execute the output, when the control section determines that the document region extracted from the second image data is included in the first region, applies the fourth output setting to the document region to execute the output, and when the control section determines that the document region extracted from the second image data is included in the second region, applies the fifth output setting to the document region to execute the output.

8. The image reading system according to claim 1, further comprising:

a display section configured to display visual information, wherein the control section causes the display section to display an aspect of division of the plurality of divided regions in the image data.

9. The image reading system according to claim 8, wherein the control section causes the display section to display at least a part of contents of the output setting associated with each of the divided region.

10. An image reading device comprising:

a transport section configured to transport a document in a predetermined transport direction;

a reading section configured to read the document transported by the transport section; and a control section configured to output image data generated by reading by the reading section to a designated output destination, wherein the transport section includes a first transport section and a second transport section at different positions in an intersecting direction intersecting the transport direction, the image reading device includes a storage section configured to store a correspondence relationship between each of a plurality of divided regions, which are different regions of the image data and which include a first region corresponding to the first transport section side in the intersecting direction and a second region corresponding to the second transport section side in the intersecting direction, and output settings applied to the image data during a process for output, and the control section extracts a document region corresponding to the document from the image data, determines which of the divided regions includes the document region, when the control section determines that the document region is included in the first region, applies a first output setting associated with the first region among the output settings stored in the storage section to the document region to execute the output for the document region, when the control section determines that the document region is included in the second region, applies a second output setting associated with the second region among the output settings stored in the storage section to the document region to execute the output for the document region, when the document region includes specific information indicating that the document is a setting sheet for changing the output setting, the control section does not determine which of the divided regions includes the document region, acquires the first output setting after change and the second output setting after change from the document region, updates the first output setting stored in the storage section with the first output setting after the change, and updates the second output setting stored in the storage section with the second output setting after the change.

11. An image reading method comprising:

a transporting step of transporting a document in a predetermined transport direction by a transport section;

a reading step of reading the document transported in the transporting step; and an outputting step of outputting image data generated in the reading step to a specified output destination, wherein the transport section includes a first transport section and a second transport section at different positions in an intersecting direction intersecting the transport direction and in the outputting step, extracting a document region corresponding to the document from the image data, determining in which of a plurality of divided regions the document region is included, the plurality of divided regions being different regions of the image data and including a first region corresponding to the first transport section side in the intersecting direction and a second region corresponding to the second transport section side in the intersecting direction, referring to a storage section that stores a correspondence relationship between each of the plurality of divided regions and an output setting to be applied to the image data during a process for the output, when determining that the document region is included in the first region, applying a first output setting, which is among the output settings and is associated with the first region, to the document region to execute the output for the document region, and referring to the storage section, when determining that the document region is included in the second region, applying a second output setting, which is among the output settings and is associated with the second region, to the document region to execute the output for the document region, and when the document region includes specific information indicating that the document is a setting sheet for changing the output setting, a control section does not determine which of the divided regions includes the document region, acquires the first output setting after change and the second output setting after change from the document region, updates the first output setting stored in the storage section with the first output setting after the change, and updates the second output setting stored in the storage section with the second output setting after the change.

* * * * *